United States Patent [19]

Meeker

[11] 4,267,140
[45] May 12, 1981

[54] METHOD AND APPARATUS FOR SHAPING THERMOPLASTIC SHEETS

[75] Inventor: James A. Meeker, Toledo, Ohio

[73] Assignee: Libbey-Owens-Ford Company, Toledo, Ohio

[21] Appl. No.: 135,212

[22] Filed: Mar. 28, 1980

[51] Int. Cl.³ .......................................... B29C 17/02
[52] U.S. Cl. ................................. 264/291; 425/383; 425/384; 425/DIG. 53
[58] Field of Search ................ 264/291; 425/383, 384, 425/140, DIG. 53, DIG. 236; 26/51, 71, 88, 92

[56] References Cited

U.S. PATENT DOCUMENTS

| | | | |
|---|---|---|---|
| 2,885,732 | 5/1959 | Kazmaier et al. | 264/291 |
| 3,341,889 | 9/1967 | Miller et al. | 425/140 |
| 3,419,651 | 12/1968 | Miller et al. | 264/291 |

Primary Examiner—James B. Lowe
Attorney, Agent, or Firm—Collins, Oberlin & Darr

[57] ABSTRACT

A method of and apparatus for stretching and shaping generally rectangular, refrigerated, thermoplastic sheets for ultimate use as interlayers in curved laminated glass units. The apparatus includes a frame assembly having spaced apart clamping assemblies for supporting the transverse edges of the sheets and means for urging the clamping assemblies apart during the heat-softening of the sheets to laterally stretch and distort the sheets into their final desired shapes.

11 Claims, 6 Drawing Figures

METHOD AND APPARATUS FOR SHAPING THERMOPLASTIC SHEETS

BACKGROUND OF THE INVENTION

The present invention relates generally to the production of glare-reducing windows and the like and, more particularly, to an improved apparatus for shaping the plastic interlayer utilized in bent, laminated safety glass windshields.

Glare-reducing laminated windshields employed in present-day automobiles generally utilize a plastic interlayer having a colored or neutral shaded band extending across the upper marginal edge portion thereof. This band is preferably graduated with the greatest concentration of light-absorbing dye being present nearest the periphery of the plastic interlayer and the concentration thereof diminishing gradually downwardly toward the other edge of the band until finally becoming almost imperceptible at the fade-off line. It has been found that this band greatly reduces the discomfort to the driver and other occupants of the automobile which normally results from direct sun glare through a windshield.

Since the windshield in present autmobile designs is mounted in a tilted or non-vertical attitude and because of the longitudinal curvature of the windshield, the otherwise flat plastic interlayer having a rectilinear colored band must be shaped or warped prior to lamination to obtain a fade-off line which is horizontal and substantially parallel to the horizon when the finished curved windshield is installed in its functional inclined position in the automobile.

In a typical plastic interlayer shaping operation, a plurality of continuous lengths of suitable thermoplastic material are withdrawn from separate supply rolls and, while superimposed one upon the other, are clamped at their free ends in a frame and uniformly stretched or placed in tension. While maintained in this stretched condition, the continuous lengths of plastic also are clamped in the frame along a line remote from the free ends thereof and then cut transversely from the continuous lengths outwardly of the frame to provide a plurality of individual sheets. Thus, the sheets are clamped in the frame along the two opposite transverse edges only. A succession of these frames, each with a plurality of uniformly taut or tensioned sheets clamped therein, are supported in a vertical orientation and moved in spaced relation first through a heating zone and then through a cooling zone. During heating, the sheets become pliable and the central portions, as well as the unsupported edges thereof, sag downwardly by gravity in the plane of the sheets to the desired curvatures or shapes. Sometimes, external tractive forces are applied to the lower, unsupported edges of the sheets to assist in distorting or warping the sheets to the desired curvatures. While maintained in such distorted or warped condition, the sheets are cooled to set the same in these desired shapes.

In order to prevent sticking between the adjacent convolutions of the supply roll of thermoplastic material and to facilitate subsequent dispensing and handling, it is customary to provide a suitable parting agent in the form of a powder between adjacent convolutions. However, the parting agent not only creates a dusty and polluted atmosphere but, more importantly, requires removal, as by washing for example, from the plastic sheets prior to final assembly with the glass panels. As a result, refrigerated thermoplastic material has been developed to obviate the need for a parting material and the disadvantages associated therewith. However, the rigidity of such refrigerated plastic material poses problems in properly stretching and tensioning the same as required by the shaping operation in order to produce glare-reducing windows.

SUMMARY OF THE INVENTION

Accordingly, the primary object of the present invention is to provide a new and improved method of and apparatus for shaping the refrigerated thermoplastic sheets ultimately utilized as interlayers in glare-reducing glazing closures.

It is another object of this invention to provide an improved frame assembly for stretching and shaping pre-refrigerated thermoplastic sheet material.

Another object of the present invention is to provide the foregoing frame assembly with means for biasing the clamping members apart during the thermoplastic sheet heat-softening process to stretch and simultaneously distort such sheets to the desired shapes.

The foregoing and other objects, advantages, and characterizing features of the present invention will become clearly apparent from the ensuing detailed description thereof, considered in conjunction with the accompanying drawings, wherein like reference numerals denote like parts throughout the various views.

DESCRIPTION OF THE PREFERRED EMBODIMENT

Figure 1:
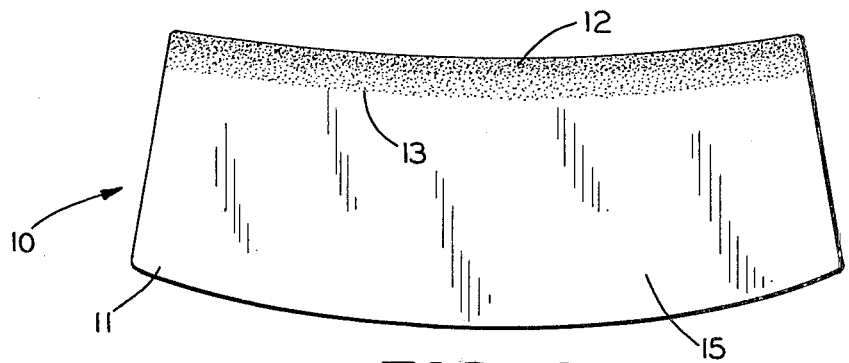
FIG. 1 is a front elevational view of the plastic interlayer shaped in accordance with the principles of this invention.

Referring now in detail to the illustrative embodiment depicted in the accompanying drawings, there is shown in FIG. 1 a plastic interlayer 10 adapted to be interposed between and bonded to two sheets of curved glass to form a composite, laminated, glare-reducing glazing closure, such as an automobile windshield for example. The interlayer 10 comprises a sheet 11 formed of a suitable thermoplastic material, such as polyvinyl butyral resin for example, and is provided with a glare-reducing area or band 12 extending along and parallel to the upper longitudinal edge of the sheet. The band 12 may be of a colored or neutral shade, as desired, and graduated in intensity from a relatively dark hue adjacent the upper marginal edge of the sheet 11 to practical extinction at the inner or lower edge of the band so as to terminate in an almost imperceptible fade-off line 13 between the band 12 and the medial viewing area 15 of the sheet. As is known, the purpose of the band 12 is to provide within the finished laminated glazing closure, an area effective to reduce, if not eliminate, objectionable glare directly from the sun or indirectly via reflection from the vehicle's hood and the road surface.

Because the windshield in present automotive designs is mounted in a tilted or inclined attitude and because of the longitudinal curvature thereof about the transverse axis of the windshield, it is necessary to distort or warp an interlayer having a glare-reducing band into the shape shown in FIG. 1 in order to obtain a glare-reducing band which is horizontal and substantially parallel to the horizon when the windshield is installed in its inclined functional poisiton in the automobile.

To this end, the present invention contemplates shaping or preforming a generally rectangular thermoplastic sheet having a rectilinear glare-reducing band extending along and parallel to the upper longitudinal edge thereof into a warped or curved shape for use in a curved, laminated glazing closure. In accordance with the present invention, a novel apparatus in the form of a support frame assembly, generally designated 16 and hereinafter more fully described in detail, is provided for shaping or preforming generally rectangular, thermoplastic sheets into these desired curved shapes. The support frame assembly 16 is especially suited for accommodating refrigerated thermoplastic sheet material, the advantages of which were hereinbefore mentioned.

Figure 2:
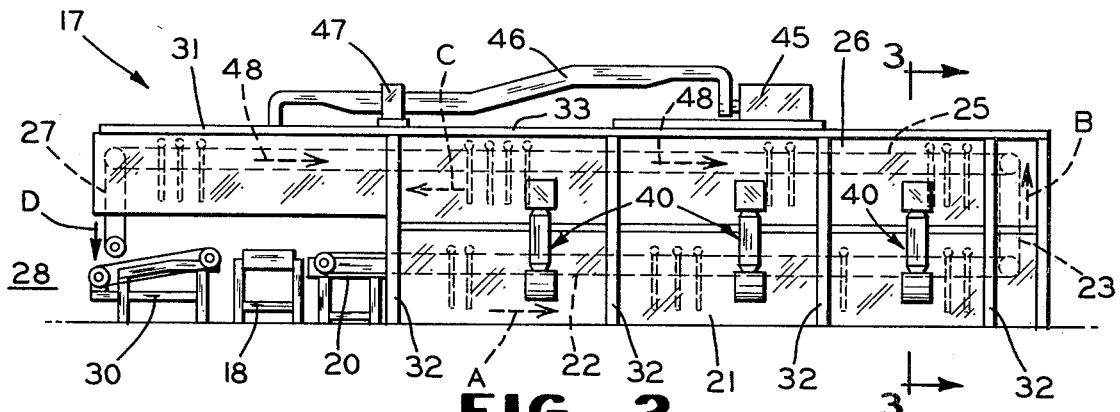
FIG. 2 is a schematic side elevation of a continuous shaping apparatus through which the sheet-supporting frame assemblies of this invention are conveyed.

As shown in FIG. 2, a plurality of sheet-supporting frame assemblies 16 are automatically carried through an apparatus, comprehensively designated 17, having successive zones of heating and cooling to effect the desired shaping of the sheets. Apparatus 17 is constructed to carry out the heating and cooling phases of the shaping operation in a substantially continuous path of movement indicated by arrows A-D and including a forward direction through the heating area along the lower level indicated by arrow A, then upwardly as at B, rearwardly through the cooling area along an upper level as indicated at C, and then downwardly at D. The refrigerated, rectangular sheets 11 are attached to frame assemblies 16 at an assembly station 18 which is the starting point of the path of sheet movement. The frame-supported sheets are then placed on an oven delivery table 20 and then advanced into and through a heating oven 21 on a conveyor system 22 in the direction of arrow A. The temperature of the heating oven 21 is gradually reduced from the entry end towards the exit end thereof. At the exit end, the frame assemblies 16 are conveyed from conveyor system 22 onto an elevator system 23 and moved upwardly in the direction of arrow B. At the upper end of conveyor system 23, the frame assemblies 16 are transferred onto a conveyor system 25 at the entry end of a cooling tunnel 26 in the upper level of the apparatus 17 and moved in the direction of arrow C. At the opposite or exit end of cooling tunnel 26, the sheet-supporting frame assemblies 16 are successively received on a so-called "lowerator" system 27 by means of which the frame assemblies 16 are lowered in the direction of arrow D and delivered into an assembly room 28.

As the sheet-supporting frame assemblies 16 are moved downwardly by system 27, the shaped sheets are removed therefrom and stored in the controlled atmosphere of room 28 wherein the shaped sheets are subsequently assembled between sheets of glass preparatory to the final laminating operation. The now empty frame assemblies 16 are placed on a conveyor table 30 and returned to the assembly station 18.

Figure 3:
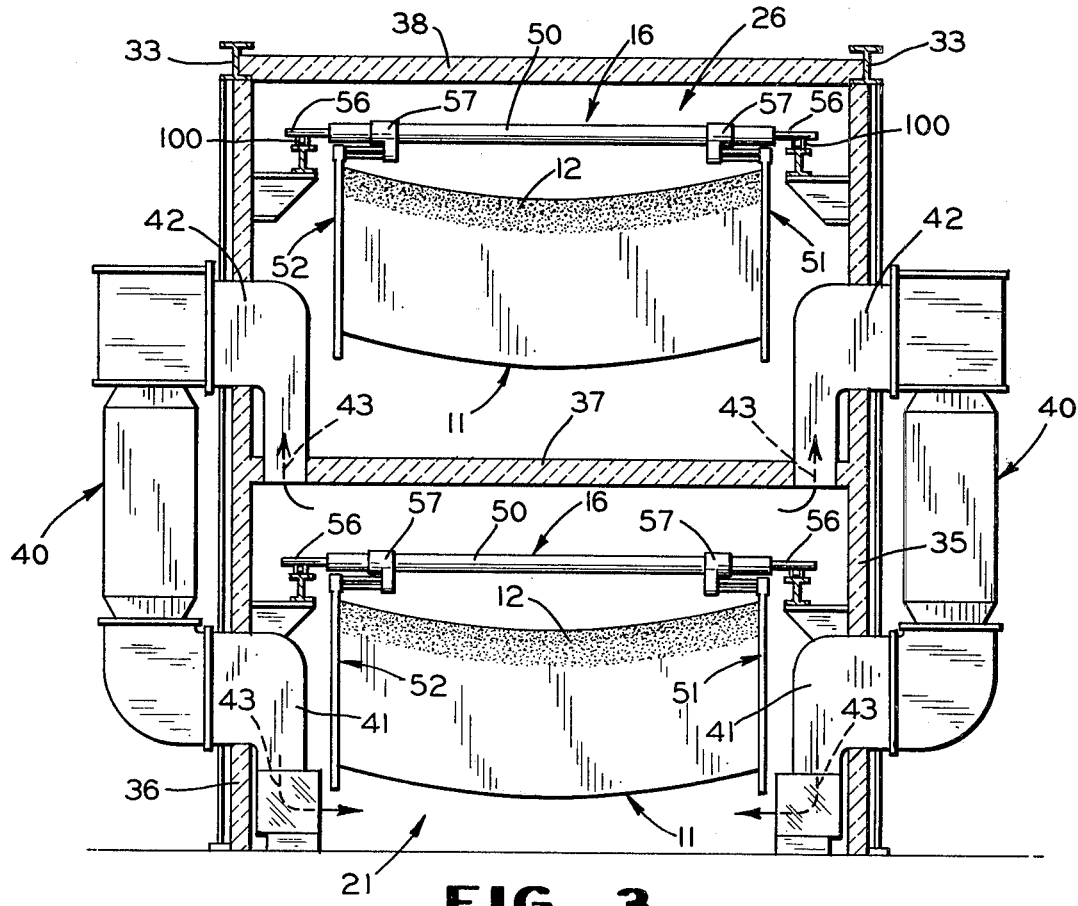
FIG. 3 is a vertical sectional view, on an enlarged scale, taken along line 3—3 of FIG. 2.

Apparatus 17 is comprised of a structural framework having vertically disposed columns 32, longitudinally extending horizontal beams 33 and suitable transverse beams (not shown) interconnected and tied together to form a rigid, box-like structure. The enclosing walls of apparatus 17 include side walls 35 and 36 (FIG. 3), suitable end walls, a horizontally disposed partition 37 between the heating oven 21 and the cooling tunnel 26, and a roof 38. These walls are formed of suitable insulating materials to maintain the desired temperatures within the heating and cooling zones and to prevent undesired entry of ambient air into these zones.

In order to produce optimum results, the atmospheres in the heating oven 21 and cooling tunnel 26 must be carefully controlled. To this end, an air circulation system is provided to force reconditioned heated air into the oven 21 to heat and thereby thaw the refrigerated thermoplastic sheets and then shape the same and to supply cooler air into the cooling tunnel 26 to set the sheets in their desired configurations. The air circulation system includes a series of suitably spaced units 40 along the side walls 35 and 36, each having a duct 41 (FIG. 3) to introduce dry, heated air at the desired temperature into the heating oven 21 adjacent the bottom thereof. The heated air rises upwardly and is withdrawn from the upper area of the oven 21 through ducts 42 passing through the partition 27. The direction of air currents is generally shown by the several broken line arrows designated by the numeral 43. These units 40 are arranged to provide zones of different temperatures within the oven 21 and thus regulate the rate at which the thermoplastic sheets passing therethrough will become heat-softened. The desired ranges of temperatures are dictated by the initial temperature of the sheets, their lengths and the amount of sagging or distortion to be developed therein to obtain the desired shape. The zones are regulated to thermally decrease the temperature of the oven atmosphere progressively from the entry end of the oven to the exit end thereof.

Also, a conditioning system is provided for directing relatively cool and dry air under pressure into the cooling tunnel 26. This system includes an air dryer unit 45 connected by ductwork to a suitable stack (not shown) and also by ductwork 46 through a conventional cooling coil unit 47 to a suitable manifold (not shown) located in the roof area of the cooling tunnel 26. The currents of cooling air introduced into the tunnel 26 move in the direction of arrows designated 48 through the cooling tunnel 26 and then downwardly through the open area of the conveyor system 23 into the heating oven 21. It is believed that the pressure of the air moving downwardly into the heating oven 21 acts as a pneumatic cushion to obstruct upward movement of the air within the oven 21.

Figure 4:
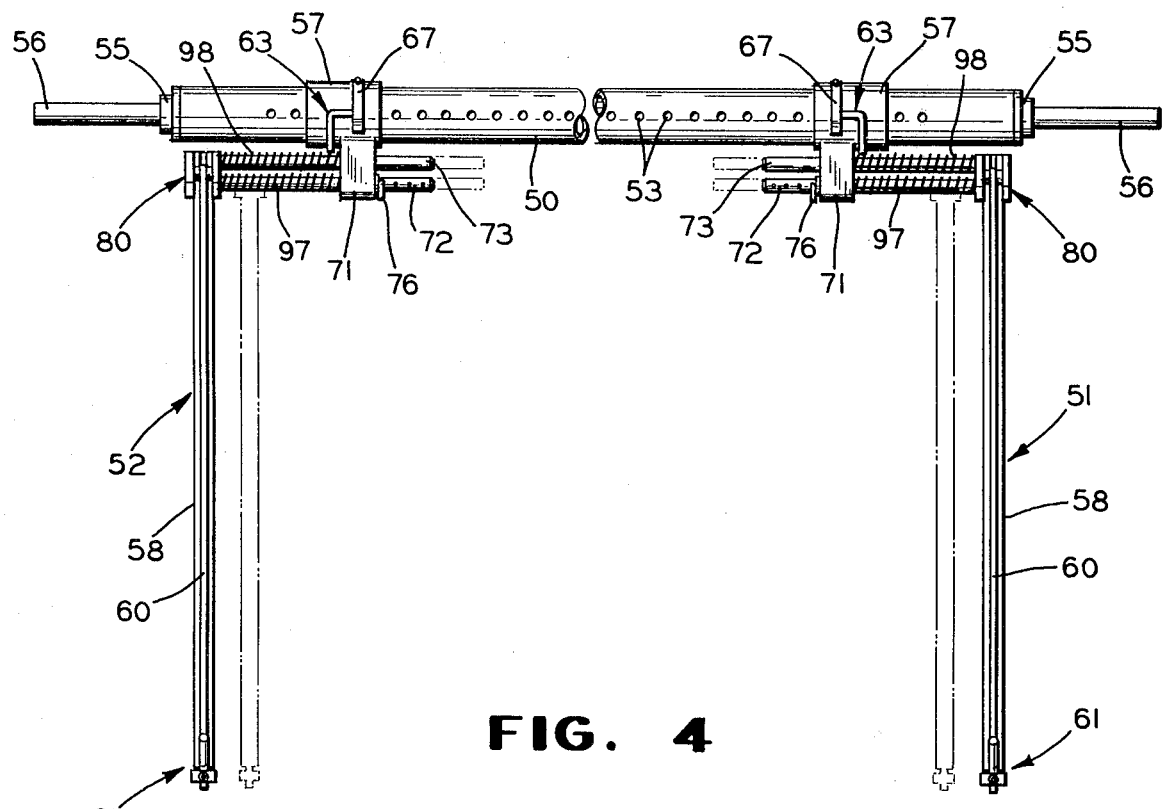
FIG. 4 is a front elevational view of a sheet-supporting frame assembly constructed in accordance with this invention.
Figure 5:
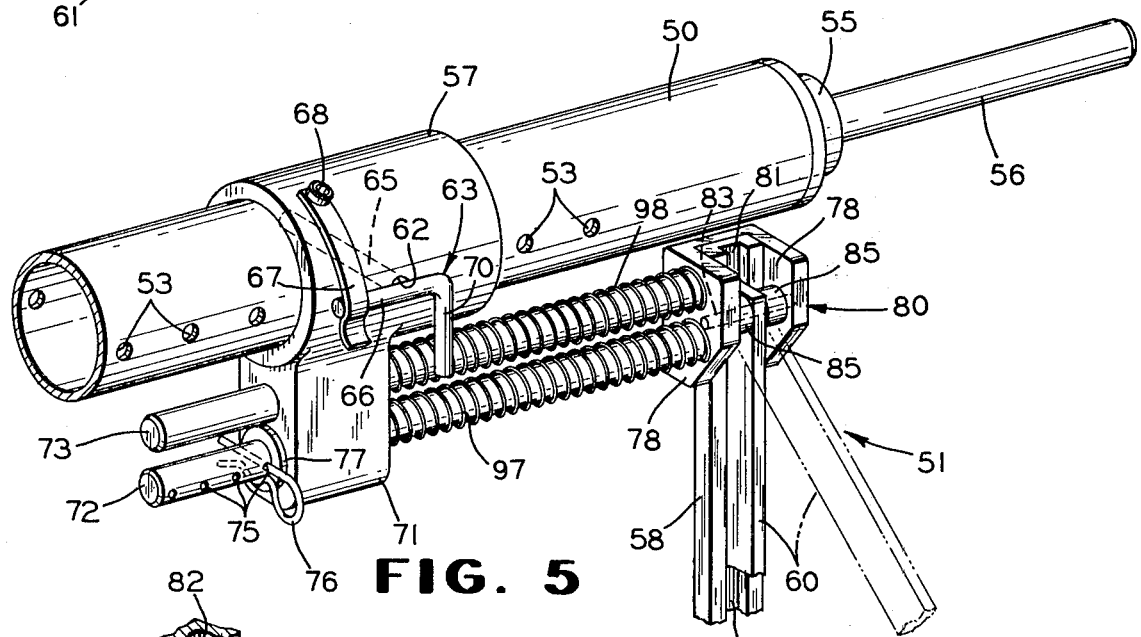
FIG. 5 is an enlarged, fragmentary, perspective view of one of the spring-loaded clamps forming a part of the frame assembly of FIG. 4.
Figure 6:
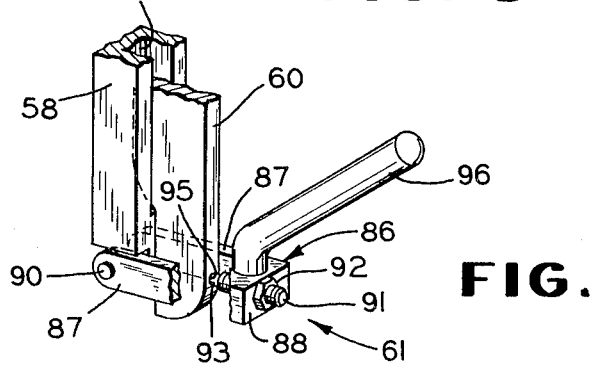
FIG. 6 is an enlarged fragmentary perspective view of a locking device forming a part of the support frame assembly of this invention.

Referring now particularly to FIGS. 4-6 of the drawings, there is shown in detail the support frame assembly 16 constructed in accordance with this invention. The frame assembly 16 includes a relatively lightweight, tubular circuit bar 50 and a pair of sheet clamping assemblies 51 and 52 suspended from the carrier bar 50 and adapted to secure the transverse opposite edges of a thermoplastic sheet. The carrier bar 50 is provided with a plurality of longitudinally spaced diametrically aligned paired openings 53 for a purpose hereinafter described. Each end of the carrier bar 50 is closed by a plug 55 having a cylindrical supporting rod 56 rigidly secured thereto and projecting axially outwardly therefrom.

The clamping assemblies 51 and 52 are substantially identical in construction but mirror images of each other, each comprising a collar 57 slidably mounted on the carrier bar 50, clamping arms 58 and 60 indirectly attached to the collar for securing the opposite transverse edge portions of the sheets, and a locking device 61 (FIG. 6) for securing the clamping arms 58 and 60 together.

The collars 57 of the assemblies 51 and 52 can be adjustably slid along the carrier bar 50 and then set in such adjusted positions to dispose them in the desired spaced-apart relation corresponding to the particular lengths of the thermoplastic sheets to be shaped. To this end, each collar 57 is provided with a pair of diametrically opposed openings 62 adapted to register with the carrier bar openings 53 when the clamping assemblies 51 and 52 are adjusted to their selectively spaced positions. A locking key, generally designated 63, is formed with a pin or shank 65 for insertion into the aligned openings of collar 57 and carrier bar 50, respectively, to secure the associated collar 57 in the desired position. The key 63 also is formed with an integral transverse bar 66 adapted to bear against the outer surface of collar 57 and held in place by means of a spring clip 67 secured at one end thereof to the collar by a pivot pin 68. The clip 67 can be swung laterally about the pivot pin 68 to free the bar 66 for removal or insertion of the pin 65. The bar 66 is formed with an angularly related portion 70 which serves as a handle to facilitate easy insertion and removal of the pin 65 into and out of the aligned openings of the collar 57 and carrier bar 50, respectively.

Each collar 57 is provided with a depending lug 71 formed with a pair of vertically spaced bores therethrough for receiving a pair of rods 72 and 73 extending and slidable therethrough. The lower rod 72 is provided adjacent one end thereof with a series of longitudinally spaced, transverse openings 75 for selectively receiving a hitch pin clip 76 adapted to bear against a washer 77 disposed about rod 72 and which serves as a stop in limiting outward movement (to the right as viewed in FIG. 5) of the rod 72. The other ends of the rods 72 and 73 are affixed to one of two opposite side walls 78 of a generally U-shaped lug 80 having a web portion 81 separating the walls 78. The clamping arm 58 is rigidly secured at its upper end to the web 81 of lug 80 and is substantially U-shaped in cross section to define a longitudinally extending channel 82 for receiving the other clamping arm 60. The clamping arm 60 is pivotally mounted on a transverse pivot pin 83 supported in walls 78 and is centered thereon in registry with channel 82 as by spacer elements 85 disposed on the opposite sides of arm 60.

The locking device 61 comprises a U-shaped bracket 86 having a pair of opposite legs 87 connected by web 88. The distal ends of the legs 87 are pivotally mounted, as by means of a pivot pin 90, on the lower end of the clamping arm 58 for movement between an upper operative, locking position shown in FIG. 6 and a lower inoperative, out-of-the-way position. A tapped opening is formed in the web 88 for receiving a screw 91 held in place by lock nut 92 and provided with a spring loaded detent 93 adapted to be inserted into a recess 95 formed in the front face of clamping arm 60. A handle 96 is provided on the bracket 86 for manually moving the locking device between its operative and inoperative positions.

It should be appreciated that the frame assembly 16 is adapted to support refrigerated thermoplastic sheets which are not pre-stretched and thereby not laterally tensioned prior to securement onto the frame assembly 16 as is otherwise done with unrefrigerated plastic material in prior known processes. In fact, any tension forces applied to such refrigerated, rigid plastic material would tend to crack, rupture or otherwise damage the same. Accordingly, means are provided to effect a gradual stretching and tensioning of the refrigerated thermoplastic sheets as the stresses therein are relieved during the successive thawing and heat-softening thereof during their passage through the heating oven 21. Such means include helical springs 97 and 98 disposed about the rods 72 and 73, respectively, in abutting engagement at their respective opposite ends against lugs 71 and the inner side wall 78 of lug 80. These springs impose a bias force against the clamping assemblies 51 and 52, urging the same apart as the thermoplastic sheets secured therebetween become heat-softened to stretch and laterally tension the same. The selective positioning of the hitch pin clips 76 in openings 75 of rods 72 determines the extent of stretching, in turn dictated by the size of the sheet and the degree of curvature required in the glare-reducing band for use with the specific bent glass sheets with which the distorted plastic sheets are subsequently assembled.

In operation, the clamping assemblies 51 and 52 are spaced apart along the carrier bar 50, as by means of openings 53 and locking keys 63, a distance corresponding to the pre-cut lengths of the refrigerated thermoplastic sheets adapted to be supported thereby. The opposite ends of several rigid, refrigerated thermoplastic sheets are secured between the channel arms 58 and the pivotal arms 60 of the clamping assemblies 51 and 52. While preferably a plurality of sheets 11 are supported by the frame assembly 16, it should be appreciated that a single sheet may be thus supported, if desired. The pivotal arm 60 of each clamping assembly is considerably thinner in width than the width of the associated channel 82 in the opposed arm 58 to accommodate the several superimposed sheets within channel 82. When the opposite ends of the sheets 11 are properly clamped between the arms 58 and 60 of the clamping assemblies 51 and 52, the locking device 61 of each assembly is pivoted upwardly with its detent 93 riding along the arcuately shaped cam surface formed at the lower end of arm 60 until such detent reaches and is inserted under the influence of its spring bias into the recess 95. This maintains or locks the arms 58 and 60 in their clamped relation.

The sheets are attached to the frame assembly 16, as described above, at the assembly station 18. Each frame assembly 16, supporting a plurality of refrigerated thermoplastic sheets 11, is placed on the delivery table 20 for advancement by the conveyor system 22 into the heating oven 21. The conveyor system 22 preferably comprises a suitable dual conveyor chain belt 100 located interiorly of and along the opposite side walls 35 and 36 of the apparatus 17 and which support the opposite projecting rods 56 of carrier bar 50 to carry a succession of such sheet-supporting frame assemblies 16 in spaced relation through their circuitous path within apparatus 17. Since the conveyor system 22, as well as conveyor systems 23, 25, and 27, and the means for effecting a transfer of the frame assemblies 16 therebetween, are conventional and form no part of the present invention per se, it is believed that no further amplification or detailed description thereof is necessary. And while a chain belt type conveyor system is preferable, any suitable conveying arrangement capable of advancing the frame assemblies 16 in a spaced relation through the desired circuitous path can be used in lieu of a chain belt, if desired.

The sheet supporting frame assemblies 16 are thus carried through the heated atmosphere of the oven 21 in the direction of arrow A. As earlier mentioned, the temperature of the oven is progressively decreased from the highest temperature at the entry end of the oven to relatively warm temperatures adjacent the exit end thereof. As the refrigerated sheets become heat-softened and pliable during their advance through the heated atmosphere of the oven 21, the initial compressive stresses therein become sufficiently relaxed or relieved and are overcome by the tension stresses exerted by the spring loaded clamping assemblies 51 and 52. This causes the clamping assemblies 51 and 52 to move apart relative to each other, stretching and laterally tensioning the thermoplastic sheets secured therebetween. Such stretching continues until the sheets have been laterally tensioned a predetermined maximum extent as determined or limited by the engagement of hitch pins 76 against lugs 71. As this predetermined limited lateral tension is achieved and the sheets become further relaxed, the sheets will sag or distort downwardly between the clamped transverse edges via gravity by reason of their own weight into an arcuate curvature corresponding to the ultimately desired shape wherein the longitudinal edges and the glare-reducing bands become curved with respect to the horizontal.

At the exit end of the oven 21, the sheets are transferred from the conveyor system 22 onto conveyor system 23 and lifted upwardly, then transferred onto conveyor system 25 for movement through the cooling tunnel 26. The cooling air is forced into the cooling tunnel 26 in an area adjacent its exit end to cause movement of such air around and about the sheets to cool the same while moving in a direction opposite to the direction of sheet travel. As the distorted or shaped sheets are carried through the cooling tunnel 26 in the direction of arrow C, they become sufficiently "set" to retain and preserve the shaped curvature imparted thereto during the heating phase of the sheets.

At the exit end of the cooling tunnel 26, the sheet-supporting frame assemblies 16 are transferred from the conveyor system 25 onto the conveyor or "lowerator" system 27. As the frame assemblies 16 move downwardly, the shaped sheets 11 are removed from the frame assemblies 17 and deposited in the controlled atmosphere of assembly room 28 for storage and wherein the sheets are ultimately assembled between a pair of glass sheets preparatory to the final laminating operation. The empty frame assemblies 16 are removed from conveyor system 27 and placed on conveyor table 30 for subsequent successive use and the above-described cycle is repeated.

From the foregoing, it is apparent that the objects of the present invention have been fully accomplished. An improved frame assembly is provided, and especially suited, for accommodating refrigerated thermoplastic sheets adapted to be heat-softened and distorted into desired shapes or curvatures. The frame assembly is provided with means for urging the opposed sheet securing or clamping assemblies apart during the heating of the refrigerated, thermoplastic sheets to laterally stretch and then distort or shape the same into desired curvatures.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. A method of shaping a generally rectangular refrigerated thermoplastic sheet having opposite longitudinal and transverse edges comprising: supporting said refrigerated thermoplastic sheet in a substantially vertical plane by clamping the opposite transverse edges thereof such that the opposite longitudinal edges thereof are disposed generally horizontally, heating said sheet while applying lateral tension forces to said opposite transverse edges to stretch said sheet laterally a predetermined amount as said sheet becomes heat-softened, continuing to heat said sheet after stretching said sheet said predetermined amount to cause said sheet to sag and be deflected intermediate the opposite transverse edges thereof into a desired shape.

2. A method according to claim 1, wherein said sheet is deflected downwardly in the plane of said sheet by gravitational forces.

3. A method according to claim 2, wherein the longitudinal edges of said sheet become curved relative to a true horizontal during the deflection thereof.

4. A method according to claim 1, including cooling said sheet to set the same in said desired shape.

5. Apparatus for shaping a generally rectangular refrigerated thermoplastic sheet comprising: a frame having an elongated bar and clamping assemblies carried by said bar in spaced relation to each other for securing the opposite transverse edges of at least one refrigerated thermoplastic sheet, a pair of supports mounted on said bar, said supports including means mounting said clamping assemblies, respectively, thereon for sliding movement relative thereto, and means on said supports for biasing said clamping assemblies away from each other.

6. Apparatus according to claim 5, wherein said supports each comprise a collar slidably mounted on said bar, and means adjustably positioning said collars on said bar in a desired spaced-apart relation.

7. Apparatus according to claim 6, wherein each of said collars is formed with a lug provided with at least one opening therethrough, a rod fixedly secured at one end thereof to the associated clamping assembly and slidably mounted in said opening, said biasing means exerting an outwardly directed force to urge said clamping assembly away from said lug.

8. Apparatus according to claim 7, wherein said biasing means comprises a helical spring disposed about said rod and having opposite ends in abutting engagement against said lug and said clamping assembly, respectively.

9. Apparatus according to claim 7, including means for limiting outward movement of said rod and thereby said clamping assembly relative to said lug.

10. Apparatus according to claim 5, wherein each of said clamping assemblies comprises a bracket operatively connected to said support, a first elongated clamping arm secured to said bracket and having a channel extending lengthwise thereof, a second clamping arm pivotally mounted on said bracket and adapted to be inserted in said channel for clamping a transverse edge of a plastic sheet therein.

11. Apparatus according to claim 10, including means adjacent the free end of said first clamping arm for locking said arms in a clamped position.

* * * * *

UNITED STATES PATENT AND TRADEMARK OFFICE
CERTIFICATE OF CORRECTION

PATENT NO. : 4,267,140

DATED : May 12, 1981

INVENTOR(S) : James A. Meeker

It is certified that error appears in the above-identified patent and that said Letters Patent are hereby corrected as shown below:

Col. 3, line 13 "poisiton" should be --position--
Col. 4, line 59 "circuit" should be --carrier--

Signed and Sealed this

First Day of September 1981

[SEAL]

Attest:

Attesting Officer

GERALD J. MOSSINGHOFF

Commissioner of Patents and Trademarks